US006172596B1

United States Patent
Cesar et al.

(10) Patent No.: US 6,172,596 B1
(45) Date of Patent: *Jan. 9, 2001

(54) SYSTEM METHOD AND APPARATUS FOR IDENTIFYING AND COMMUNICATING WITH A PLURALITY OF TYPES OF RADIO FREQUENCY COMMUNICATION DEVICES

(75) Inventors: Christian Lenz Cesar, Shrub Oak; Thomas Anthony Cofino, Rye, both of NY (US); Kenneth Alan Goldman, Norwalk, CT (US); Sharon Louise Greene, Mt. Kisco, NY (US); Harley Kent Heinrich, Brewster, NY (US); Kevin Patrick McAuliffe, Peekskill, NY (US); Richard Michael Smyczynski, Fishkill, NY (US)

(73) Assignee: Intermec IP Corp., Woodland Hills, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/811,989

(22) Filed: Mar. 5, 1997

Related U.S. Application Data (63) Continuation-in-part of application No. 08/303,965, filed on Sep. 9, 1994, now Pat. No. 5,673,037.

(51) Int. Cl.$^7$ .................................................. H04Q 1/00
(52) U.S. Cl. ........................................................ 340/10.41
(58) Field of Search .............................. 340/825.54, 572, 340/10.41, 10.4; 342/44

(56) References Cited

U.S. PATENT DOCUMENTS

| 4,827,395 | * | 5/1989 | Anders | 340/825.54 |
| 5,008,661 | * | 4/1991 | Raj | 340/825.54 |
| 5,214,410 | * | 5/1993 | Verster | 340/572 |
| 5,481,519 | * | 1/1996 | Hosoya | 235/454 |
| 5,887,176 | * | 3/1999 | Griffith | 340/825.54 |

* cited by examiner

Primary Examiner—Brian Zimmerman
(74) Attorney, Agent, or Firm—O'Melveny & Myers LLP (57) ABSTRACT

A system, method of use, and a plurality of types of Radio Frequency Transponders (RF Tags). The RF Tags carry a directory or a tag type number which determines the layout of information in the tag memory. The tag type numbers are arranged hierarchically.

50 Claims, 6 Drawing Sheets

SYSTEM METHOD AND APPARATUS FOR IDENTIFYING AND COMMUNICATING WITH A PLURALITY OF TYPES OF RADIO FREQUENCY COMMUNICATION DEVICES

CROSS-REFERENCE TO RELATED APPLICATION

The present application is a continuation-in-part of Application No. 08/303,965 filed Sep. 9, 1994, now U.S. Pat. No. 5,673,037 issued Sep. 30, 1997.

BACKGROUND OF THE INVENTION

The field of the invention is the field of Radio Frequency (RF) or Microwave communication of data and control information between a Base Station and a plurality of remotely located RF Transponders (Tags).

Identification and Location Transponders (Tags) such as radio frequency (RF) Tags have been used in a multiplicity of ways for locating and identifying accompanying objects and transmitting information about the state of the object. It has been known since the early 60's that electronic components could be powered by RF power received by an antenna and rectified by an RF diode. In the 70's, suggestions to use tags with read/write memories which back scattered the incoming RF were made. In the 70's suggestions were also made to convert part of the incoming RF radiation to a harmonic of the incoming signal, and rebroadcast this new frequency to communicate the tag information. Presently available technology uses a number of different systems, each having tags and base stations which use different kinds of tags using different frequencies, different read and write codes, tags with electronics powered with batteries, tags which transmit a different carrier frequency than does the base station, tags which communicate by changing magnetic field, by sound and ultrasound fields, etc.

Prior art systems send power from the base station to energize the tags, and the tags modulate the loading on the tag antennas to communicate the information contained in the tag memory, or the information measured by the tag, back to the base station.

Prior art systems can interrogate the tags if more than one tag is in the field. U.S. Pat. No. 5,214,410, hereby incorporated by reference, teaches a method for a base station to communicate with a plurality of Tags.

The prior art teaches a method to interrogate a plurality of tags in the field of the base station. The tags are energized, and send a response signal at random times. If the base station can read a tag unimpeded by signals from other tags, the base station interrupts the interrogation signal, and the tag which is sending and has been identified, shuts down. The process continues until all tags in the field have been identified. If the number of possible tags in the field is large, this process can take a very long time. The average time between the random responses of the tags must be set very long so that there is a reasonable probability that a tag can communicate in a time window free of interference from the other tags.

The continuing march of semiconductor technology to smaller, faster, and less power hungry circuits has allowed enormous increases of function and enormous drop of cost of such tags. Presently available research and development technology will also allow new function and different products in communications technology. There is no technology in place to handle the many different products which could be allowed by the technology.

Presently, each system of tags has matching base stations, and thus the tags of one system can not communicate information to a base station of another system. Within any given system, the tags have the same physical and software characteristics, i.e. the number of bits of read/write memory is the same, and the information stored on the tag is stored the same unstructured way for every tag in the system.

RELATED APPLICATIONS

Copending patent applications assigned to the assignee of the present invention Ser. No. 08/303,965 filed Sep. 9, 1994 entitled RF Group Select Protocol, by Chan et. al., (now U.S. Pat. No. 5,673,037 issued Sep. 30, 1997); serial No. 08/304,340 filed Sept. 9, 1994 entitled Multiple Item RF ID protocol, by Chan et. al., (now U.S. Pat. No. 5,550,5477 issued Aug. 27, 1996); Ser. No. 08/521,898 filed Aug. 31, 1995 entitled Diode Modulator for RF Transponder by Friedman et al. (now U.S. Pat. No. 5,606,323 issued Feb. 25, 1997 issued Sep. 30, 1997); Ser. No. 08/694,606 submitted Aug. 9, 1996 entitled RFID System with Broadcast Capability by Cesar et al.; and Ser. No. 08/1681,741 submitted Jul. 29, 1996 entitled RFID transponder with Electronic Circuitry Enabling and Disabling Capabilithy, by Heinrich et al. are hereby incorporated by reference. The communication time per tag generally increases with the number of tags in the field of the base station. The communication time per tag can be reduced if a particular group of tags can be selected from the plurality of tags in the field, so that the tags in the particular group can be interrogated and then shut off.

OBJECTS OF THE INVENTION

It is an object of the invention to provide a system of base stations and different types of RF tags which make efficient use of tag memory.

It is an object of the invention to provide tags having different tag types for different software types of tags.

It is an object of the invention to provide tags having different tag types for different hardware types of tags.

It is an object of the invention to provide an RF tag which may be used for different applications in succession.

It is an object of the invention to provide base stations for different software types of tags.

It is an object of the invention to provide a method of using different types of RF tags.

It is an object of the invention to provide a hierarchical system of types of RF tags.

SUMMARY OF THE INVENTION

The present invention comprises a system of one or more base stations which can communicate information to and receive information from a plurality of tag types using RF electromagnetic radiation. The present invention comprises tag types which differ in either or both hardware and software configuration. The present invention comprises a series of hardware and software tag types for differing purposes. Tags with different software types differ in the layout of information contained in the tag memory. The present invention requires that each tag carry a tag type code or number in the tag memory. In the most preferred embodiment, a computer attached to the base station determines the layout of information in the memory of a tag of a particular tag type on the basis of the tag type number. The base station computer also determines the hardware capability of the tag on the basis of the tag type number. In a preferred embodiment, the tag carries a directory with information on the layout of information in the tag memory.

DETAILED DESCRIPTION OF THE INVENTION

Figure 1:
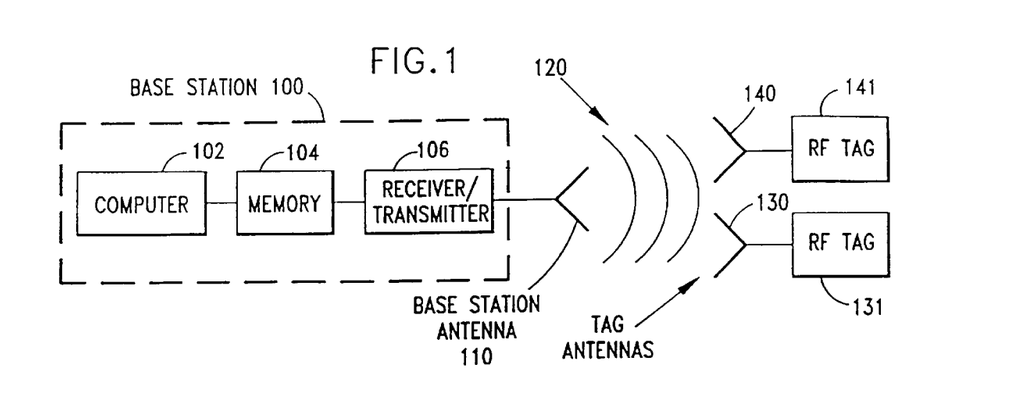
FIG. 1 A block diagram of a system of a base station communicating with a set of RF transponders (tags).

The present invention is a system of one or more base stations, (or a time sequenced series of base stations which will allow new ideas to be implemented as they occur and mature), each of which can communicate with a number of different types of communication devices. FIG. 1 shows a system comprising a base station 100 comprising a base station computer 102 or other logic devices having a base station memory 104 and a base station receiver/transmitter 106 connected to a base station antenna 110 sending RF electromagnetic waves 120 to the tag antennas 130 and 140 of two tags 131 and 141. The preferred embodiments use RF electromagnetic (EM) waves for communication between the tags 131 and 141 and the base station 100.

Figure 2:
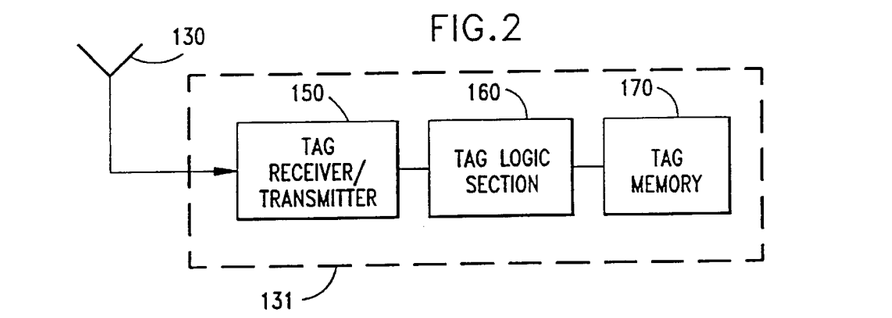
FIG. 2 A block diagram of a preferred RF tag

The most preferred embodiments use tags sketched in FIG. 2 which have a tag receiver/transmitter section 150, a tag logic section 160, and a read write tag memory section 170 which may be read and written by RF communication to and from the base station 100. The base station 100 sends RF power and information to the tag antenna 130 of tag 131. The tag receiver/transmitter 150 receives power from the RF energy 120, and transmits this power to the tag logic section 160 and the tag memory section 170. In some preferred embodiments, the tag may be powered by a battery or other power source as known in the art. The tag receiver/transmitter section 150 sends a low frequency modulation of the RF signal 120 to the tag logic section 160. The tag logic section 160 interprets the low frequency modulated signal and may write data to or read data from the tag memory 170. The tag logic section 160 may send data read from the tag memory to the tag receiver/transmitter section 150, which modulates the reflectance of the tag antenna 130 and hence transmits information to the base station 100. Each base station must be able to send information to and receive information from at least two tag types.

Each base station could have the capability of communicating with at least two types of tags which use different physical means of communicating (e.g., different RF carrier frequencies, different polarization of the RF radiation), or different modulation methods (e.g., frequency modulation, amplitude modulation, or phase modulation). Tags which communicate using the above mentioned differing physical means are examples of preferred hardware types of tags.

However, the base stations of the more preferred embodiments communicate with tag types which differ in hardware type only that the different tag types have different amounts of read/write memory and/or different functional capabilities such as locking and/or password capabilities and/or ability to obey different commands sent from the base station.

Examples of commands which a particular tag of a specific tag type might, or might not, recognize, are an enable command and a disable command, where the base station commands a particular tag or all tags of a particular hardware type to enable or disable electronic equipment attached to the tag. Further examples are the group select and group unselect commands, where particular tags or groups of tags having particular data in the tag memory are instructed to ready themselves for further communication or action or disable themselves from the further communication or action.

The base stations of the preferred embodiments communicate with tag types which differ in software type, ie tag types which use different protocols for storing information in the data of the tag memory. In the most preferred embodiment, each tag has a unique identifying number or code stored in the tag memory, (although this is not necessary for the invention) and a second number or code stored in the memory which may not be unique to the tag or to the associated object and which specifies the tag type. The tag type number identifies the layout of the information in the memory of the tag, (the software tag type), as well as hardware characteristics of the tag such as the amount of memory the tag holds and the command set recognized by the tag, (the hardware tag type).

Figure 3:
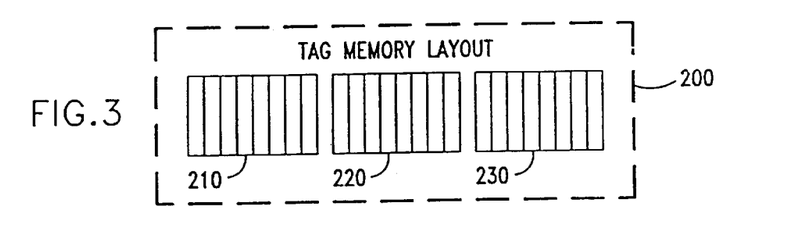
FIG. 3 An example of the most preferred memory layout of a tag having the tag memory partitioned into three memories.

FIG. 3 depicts an example of the most preferred memory layout 200 of a tag having the tag memory 170 partitioned into three memories. The first 8 bytes 210 of the tag memory layout 200 specifies the unique identifying code of the tag, the second 8 bytes 220 of the tag memory layout 200 specifies the tag type, and the remainder 230 of the tag memory layout 200 is used for other purposes. In FIG. 3, the remainder 230 is shown as 8 bytes as an example, but the invention is not limited to the amount of memory 230 remaining. It is well within the scope of the invention to have 0 bytes of memory in the remainder 230 of the tag memory layout 200. However, the tag type number would then specify that there is no memory remaining free in the tag after the unique tag identifying code 210 and the tag type 220 are written. The inclusion in the tag memory 170 of a unique identifying code 210 for the tag is preferred, but not essential for the invention. It is preferred that the tag type identifying number 220 be in the same place in the tag memory layout 200 for all tags in the system. In the most preferred example shown, the tag type identifying number or code is located in the bytes 9 through 16 of the tag memory, but the exact location and the exact number of bytes or bits is not essential to the invention. In some preferred embodiments, the location of the tag type code is decided by the tag, and the base station may ask for the tag type code by 'name' instead of asking for a particular set of bytes in a particular location.

In fact, all or portions of the tag type code or other coded information, in some preferred embodiments, could be "hard wired" in the physical layout of the chip as logic circuits and wiring. Such "hard wired" circuits are defined in this application as part of the tag memory. Other parts of the tag memory could be codable and/or recodable memory elements such as EE-PROM memory elements or FRAM memory elements or ROM memory elements. The entire tag type code could be used in communication between the tag and the base station, or just a part of the tag type code, as will be explained later.

The remainder 230 of the tag memory layout 200 in the example is shown starting at byte 17, and in general the start location of the remainder 230 will be defined by defining the amount of memory taken by the unique tag identification number and the tag type code number. It is convenient to have the remainder 230 start at a fixed location in the preferred embodiments, since the remainder 230 can in general contain many different amounts of memory. The total amount of memory contained in the tag can also be determined from the tag type code.

While the example shown in FIG. 3 shows the memory organized in bytes which consist of eight bits, it is well within the scope of the invention to have the basic unit of memory other than one byte. In the preferred embodiments, data is transferred one byte at a time. However, it is possible and desirable as tag function increases to transfer data 16 bits or 32 bits or indeed any number of bits at a time, and the memory organization would reflect the data handling unit size. The use of the specific word "byte" herein may be also read as any fixed number of bits as required by the system.

In some preferred embodiments, a tag is associated with some object, thing, or person. When the tag is associated with an object, there might be particular data fields which the tag would contain that are relevant to the object (e.g., a retail tag may contain a universal product code (UPC) and/or a Stock Keeping Unit number (SKU)). The tag type determines which information is stored on this tag, and where in the data in the tag memory the information is stored. The base station 100 then reads the tag type number or code 220, and on the basis of the tag type number or code 220 the base station can determine which information the tag contains and where in the tag memory layout 230 the information is stored. Lacking the tag type number, the data in the tag memory layout 230 is an undifferentiated string of zeros and ones containing no information or confusing information, since the data in the memory 230 could be read in one way for one type of tag, and another way for a different type of tag.

Figure 4:
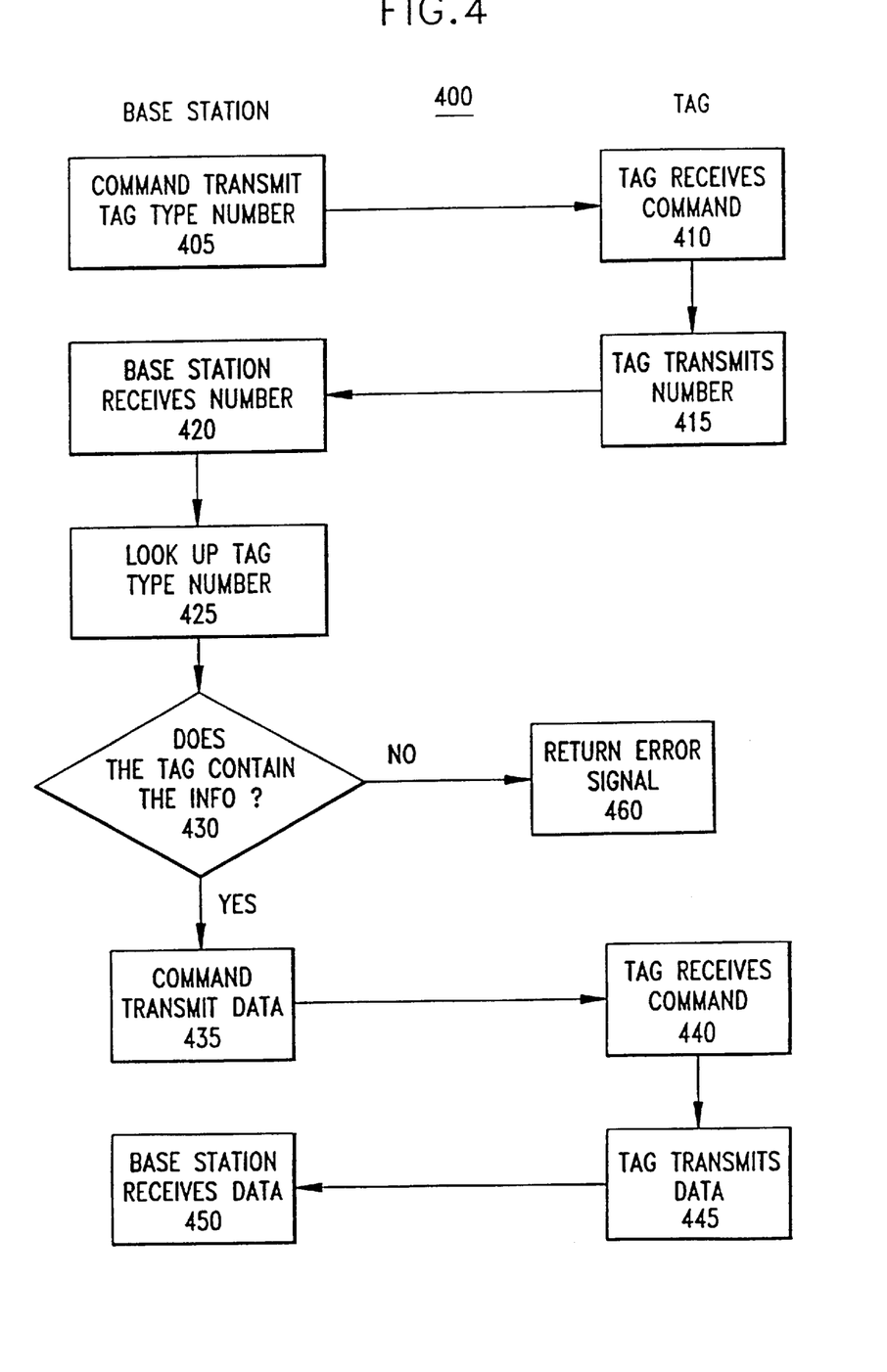
FIG. 4 A flow chart for a preferred method of using the tag type number.

If the base station already knows which type of tag is in communication, for example because that tag type code has already been received from the tag, or the tag has been group selected, as detailed in application Ser. No. 08/303,965 filed Sept. 9, 1994 entitled RF Group Select Protocol, by Chan et. al., on the basis of the tag type code, the base station can read and interpret the data in the tag memory and retrieve the information stored in the data. The base station can also write to the tags of the identified and selected tag type with a command to put a particular data set representing particular information in a particular location, and know that the data set represents the same information for each tag, and then when the data is read at a future time, the data will return the same information to the same or another base station. FIG. 4 shows a flow chart 400 for a preferred method of using the tag type number. The base station sends a command 405 to the tag to transmit the tag type number to the base station. (The most preferred command is that the tag transmits 8 bytes starting at byte 9 of the tag memory) The tag receives the command at step 410. The tag transmits the tag type number to the base station 415. The base station receives the tag type number from the tag in step 420, and looks up the tag type number in the base station memory in step 425. If the base station finds that the tag contains the desired information 430, the base station sends a command in step 435 to the tag to transmit the data which has the required information in the tag memory to the base station. (In the preferred embodiments, the base station directs the tag to transmit M bytes starting at memory location N, where M and N are integers determined by the base station lookup table.) The tag receives the command in step 440, and transmits 445 the data requested. The base station receives the data in step 450, and proceeds further with the use of the data. If the base station finds that the information required is not contained in the tag on the basis of the tag type number at step 430, the base station may return an error signal 460, or take other appropriate action. With these steps, the sequence of numbers in the data of the tag type memory are translated to information, for example, a UPC and a security code.

Figure 5:
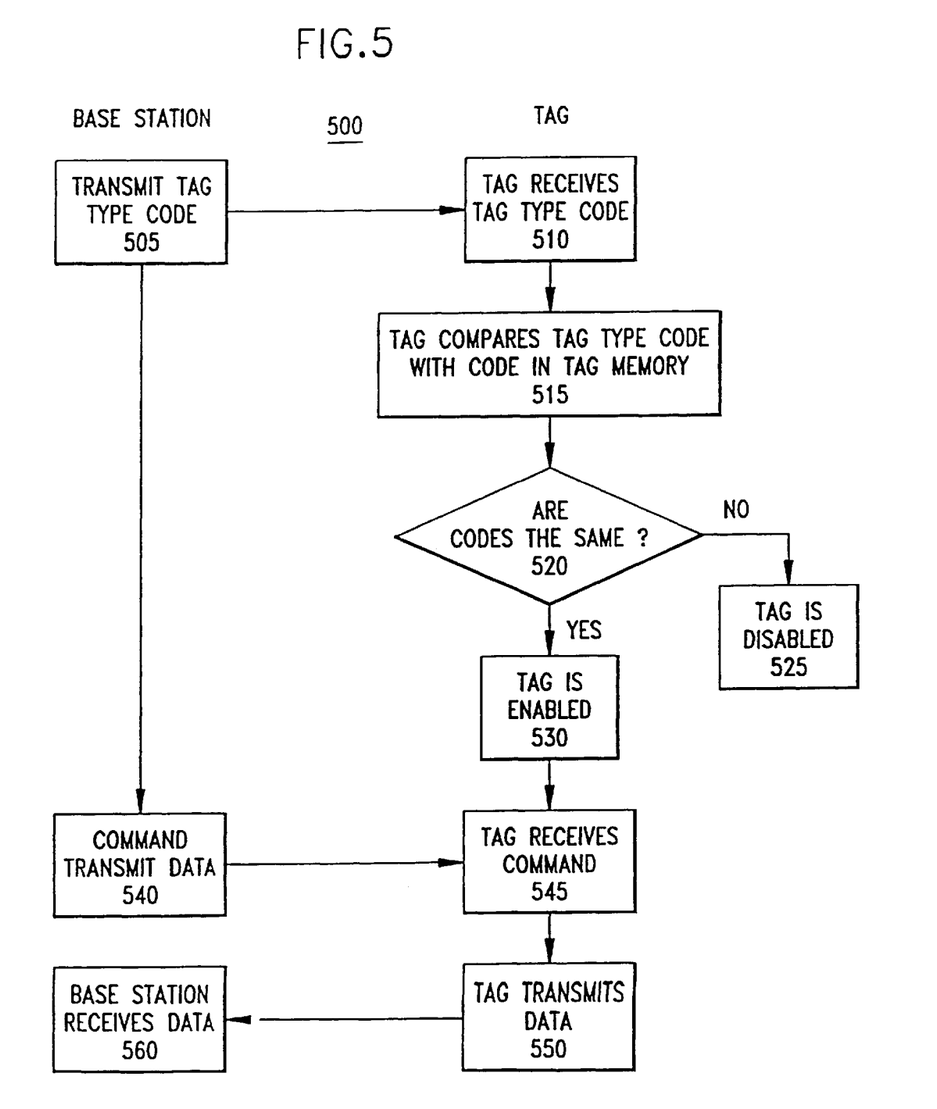
FIG. 5 A flow chart for an alternative method of using the tag type code.

An alternative preferred method 500 of using the tag type code is outlined in FIG. 5. In this case, a tag type code is transmitted from the base station to the tag in step 505. In step 510, the tag receives the tag type code. In step 515 the tag compares the tag type code transmitted from the base station with the tag type code stored in the tag memory. The tag logic makes a decision at step 520 whether the two numbers match. If the two numbers do not match 525, the tag is disabled and does not transmit for the rest of the communication protocol, or until it is specifically ordered to transmit at a later time. If the numbers match, the tag is enabled 530. The base station then knows which specific types of tags are enabled. The base station sends a command 540 to transmit data in a particular location in the tag memory back to the base station or to write data to a particular location. The base station knows that the particular data requested or sent is the particular information of interest on the basis of the lookup table. The tag receives the command to transmit data or to write data at step 545, and transmits the requested data to the base station or writes the transmitted data to the designated location in the tag memory in step 550. The base station receives the requested information in step 560. The tag type may also be used in combination with other data in the tag memory to further select sub groups for communication. The tag type code and the other data are sent from the base station to the tag, and the tag compares both the tag type code and the other data and responds only if the tag type code and the other data match. In some cases, only a subset of the tag type number may be sent for comparison purposes, as will be described later. As will be explained later, a single byte of the preferred 8 byte tag type number may ensure that a particular memory location has data such as a security code.

Figure 6:
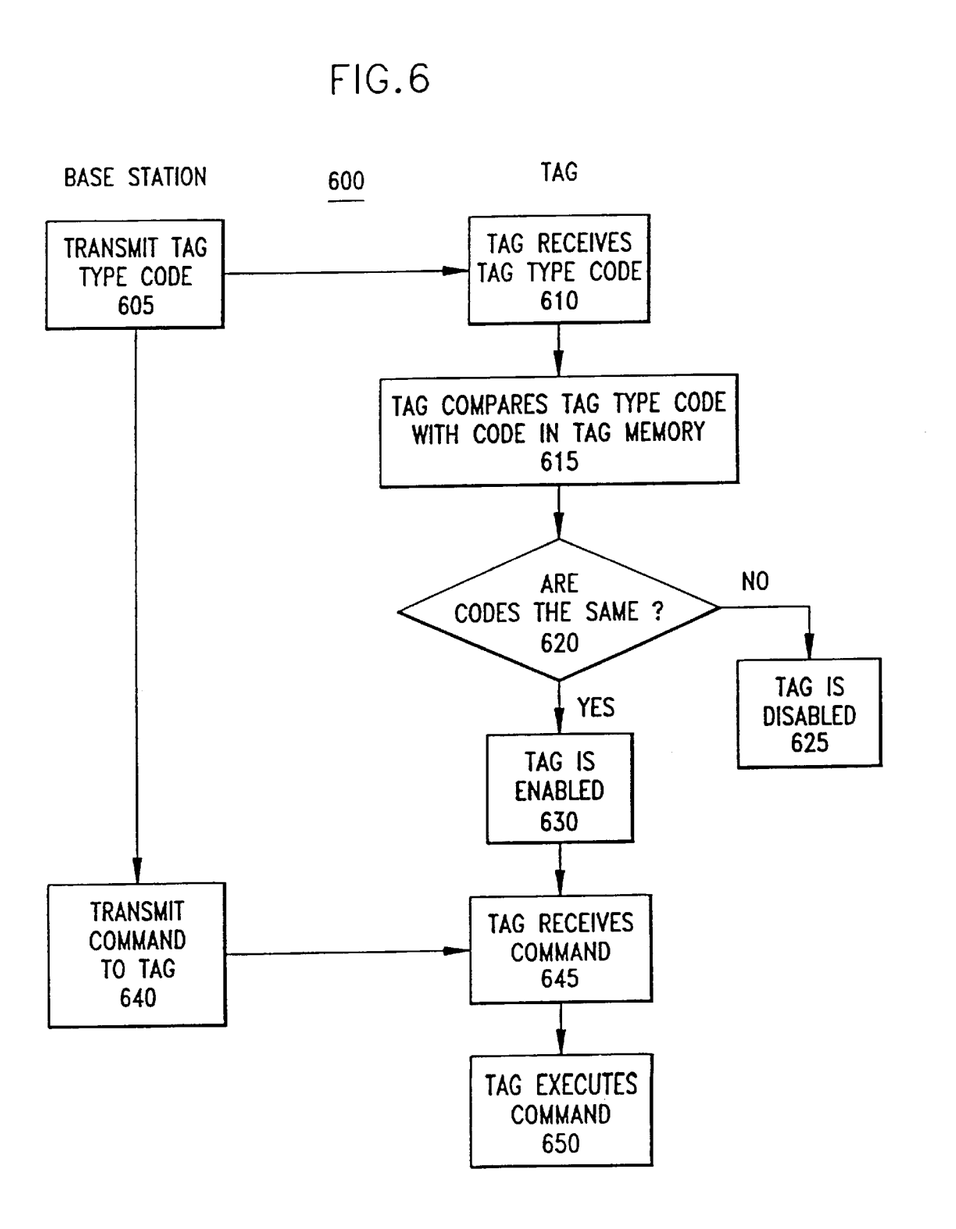
FIG. 6 A flow chart for an alternative method of using the tag type code.

An alternative preferred method 600 of using the tag type code is outlined in FIG. 6. A tag type code is transmitted from the base station to the tag in step 605. In step 610, the tag receives the tag type code. In step 615 the tag compares the tag type code transmitted from the base station with the tag type code stored in the tag memory. The tag logic makes a decision at step 620 whether the two numbers match. If the two numbers do not match 625, the tag is disabled and does not transmit or obey commands for the rest of the communication protocol, or until it is specifically ordered to transmit or "wake up" at a later time. If the numbers match, the tag is enabled 630 to obey commands from the base station. The base station then knows which specific types of tags are enabled. The base station sends a command to do something to the tag in step 640. The tag receives the command in step 645, and executes the command 650. In this way, only tags which have a tag type specifying that the tag may execute the command actually receive the command. This sequence avoids the problem that other tags will receive the command, not recognize the command, and try to communicate with the base station, thus interfering with the communications between the base station and the tags which do understand the command. One example of such a command is that the command that the tag enable or disable attached equipment.

A tag may be independent of an object, and instead of describing an associated object, be used merely to store information which then can be retrieved by RF communications. The tag type would still be used to determine the data fields on the tag as well as other tag characteristics. This use of such tags is also within the scope of the invention.

In the most preferred embodiment, the tag type number or code 220 distinguishes between different hardware types as well as describes the layout of the tag memory. In general, all tags made on the same manufacturing line have the same physical layout and the same hardware tag type. However, tags with physically different layouts are possible. They might have, for example, different antenna designs, different logic and memory circuits, different voltages necessary to run the tag, different packaging to withstand different environments, measurement circuits to measure temperature, humidity, biological activity and status, etc. and would in general have different hardware tag type numbers. The tags could be connected to instruments with various sorts of measurement capabilities. Other hardware tag types include types which require more or less power to run, or types which would signal when the power received was adequate for a write operation as distinguished from just reading the received power. Perhaps the simplest distinction a hardware type might make is one between a tag having different amounts of read/write memory 170 e.g., a 64 byte tag versus a tag having 256 bytes of memory 170. In the most preferred embodiment, the tag type number 220 is 8 bytes, with the first two bytes reserved for a hardware tag type number, which allows for 65,536 different types of hardware configurations. The remaining 6 bytes of the tag type number is a software tag type number, which allows for $2.8 \times 10^4$ different ways to lay out information in the tag memory.

The system may employ one or more types of base stations which may employ different hardware and/or software to communicate with a plurality of types of tag. In the preferred embodiments, each base station identifies and communicates with at least some of the different tag types by "reading" the tag type number or some other characteristic such as the frequency emitted from the tag. On the basis of the tag type, the base station "looks up" the protocol for communicating with the tag using a "look up" table. Instead of having to keep a very large number of unique tag identifying codes, in the base station memory or storage, or some memory associated with the base station, the base station need only keep a much reduced set of numbers, i.e. the set of tag type numbers for tags that the base station has been programmed or manufactured to recognize and to communicate with, along with the memory maps and hardware configurations of each tag type. Other methods of storing and retrieving the protocols besides "look up" tables as known in the art are well within the scope of the invention. Such methods as storing the name-value pairs or name-type-value triples on the tag and storing a name directory in the base station memory are anticipated by the inventors.

Various base stations and types of tag may be produced. In the most preferred embodiment, a base station will have the protocol for communication for the tags produced or envisioned up to the time of introduction of the base station. The tag type numbers and protocols introduced after the introduction of a particular base station type and not planned for at the time of the base station programming must be introduced to existing base stations by reprogramming the base station memory or retrofitting the base station. Alternatively or in addition, the base station could return an error message stating that an "unknown" tag type was in the field. In the most preferred embodiment, all present and future base stations would have the ability to at least read the tag type numbers of all present and future tags.

In the most preferred embodiment, the two byte hardware type number would be not be able to be changed by RF communication means once the tag is released from the manufacturing line. While the hardware tag type number is described heretofore as being contained in the tag memory, the hardware tag type number could be contained as well in the tag hardware, ie hardwired in gates, in a state machine, or in microcode. While the hardware tag type contained in tag memory could be read by a normal tag read command, it could also be read through a special command, or the hardware tag type number could be returned as part of the tag identifier. The last 6 bytes of the 8 byte tag type number in the most preferred embodiment are reserved for the "software tag type number", describing the software configuration of the tag, e.g., where the UPC is stored in the tag memory. The base station software could then interpret the data in the tag memory by knowing the software type. In the preferred embodiments, the software tag type could be changed by command from a base station if the tag memory mapping needed to change.

In the most preferred embodiment, if a difference in hardware types indicated different storage capacity (e.g., a 32 byte tag versus a 64 byte tag), the tags would also have different software types, since the full memory maps would be different in the two tags (since one is larger). However, the memory in the first 16 bytes of memory layout 230 could be mapped the same in both. This means that the mapping for a 32 byte tag could be a subset of the mapping of the 64 byte tag, and the tag type for the 16 byte tag could similarly be a subset of the tag type for the 64 byte tag. Alternatively, the same software type code could be used for both, and the hardware type code would tell the base station to ignore the unavailable data.

In the most preferred embodiment, the software type of the tag could be changed as its usage needs changed. For example, as a tagged object moved along the supply chain from manufacturer to distributor to retailer, the data needs of each party would change. The manufacturer may not care and not need to know whether the object were destined for a large retail store or a wholesale outlet, and could use the information bytes 230 on the tag for manufacturing details. The tag type would then reflect which manufacturing details were recorded and where they were stored in the tag memory. As the object and the associated tag passed from manufacturer to distributer, the distributer could erase those manufacturing details no longer needed, and change the tag type to signify the re-mapping of the freed memory. Similarly, as the object passed to the retailer, the retailer could erase those details which were not of interest, and change the tag type to signify the re-mapping of the freed memory. With the new tag type the retailer could store data relevant to his or her business, such as the date and price of the sale, whether there was a discount, the salesperson's identity, the store name, as well as warranty information.

It is important that only tags of a particular hardware tag type be able to respond to an interrogation signal and a request for identification. This "group select" command capability makes it possible to communicate with a particular tag or group of tags when more than one tag type is in range. Without the selection, communication could be difficult if tags of different types used different protocols to communicate the data contained in the tag memory. It would be as if each type of tag were 'speaking their own language.'

The base station can make use of the tag type to know which 'language' to use in the communication. It can select a group of tags based on their type and know they will all use the same communication protocol, for example.

Similarly group selection of tags with respect to their software type is very important. Without knowing where data fields reside in the tag memory it becomes impossible to know how to interpret the data being written to or read from a tag. A command to select a group of tags based on a particular software tag type will bring responses from only tags of that particular tag type. This means that data going to or coming from any tag in this selected group may then be interpreted according to the known memory map determined by that tag type.

Figure 8:
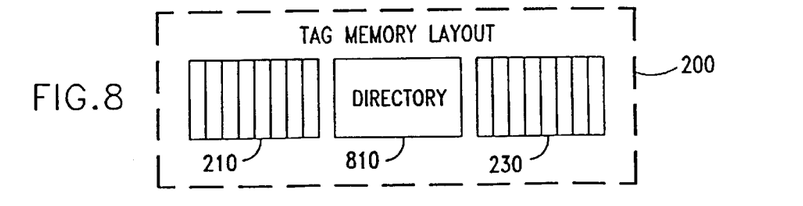
FIG. 8 A diagram of a preferred memory layout of a tag memory.

If there is enough memory on a tag, and enough processing power in the tag logic section, the tag itself can store any data field wherever it wants to in memory and the tag then knows where to find the data. FIG. 8 shows a memory layout where the tag carries a directory 810 of the information that it contains. The base station sends a command to read or write a field having a name, and the tag looks up the name in the directory. If that field exists, the tag knows from the directory the location in the tag memory where the field is stored. The tag then retrieves the information stored in the field, and transmits the information to the base station, or the tag writes the data sent by the base station to the field. In general, the fact that the tag contains a directory will be reflected in the tag type number.

However an alternative and less costly way of insuring the data get to and from the right memory location is to utilize the software type to specify the memory mapping of the tag. The intelligence required to operate the system is thus carried in the more expensive base station rather than the more numerous tags. As the amount of function carried by the tags increases with time, a base station may need to read and write a mixed group of tags. In this case, the "smart" tags which carry their own memory maps or directories would still need to carry a tag type number, which would inform the base station of the "smart" tag's capabilities.

Group selecting on a software tag type enables commands to be more efficient. If one wishes to communicate with a group of tags all at once, with a single command, all those tags must be able to understand that command and respond appropriately. There are commands that can be effective and efficiently used to write data to many tags at once via broadcasts. However, in addition to a tag having to understand the command itself (which would be determined by the hardware tag type), the data field being broadcast must 'find its way' to the correct memory location on the tag. Since group selection of tags of a particular tag type insures that those selected tags have the same memory mapping, one can now safely broadcast the data to a particular memory location without addressing each tag individually with a particular (and perhaps different) destination memory location. Now instead of having to write a data field to many tags individually, on a tag by tag basis, you can do a broadcast write to all tags of that tag type without identifying the individual tags.

As an example of the use of group select and write broadcasting on tag types, consider the checkout scenario in a retail setting. The retailer wants the customer to pay for the goods purchased, and then leave the store without those goods setting off the store alarm. First the retailer would group select on items of a certain software tag type (e.g., 'retail tag') from their store, that have not yet been paid for. In addition, the hardware type tags which recognizes the "write broadcast" command would also be selected. Then, after the customer pays, there would be a write broadcast to these items to turn off the 'alarm flag.' This command is preferably a command to write a '1' in a specific memory location. In this case, the software tag type 'retail' guarantees a specific location in the memory layout 200 for the alarm flag. Group selecting on the tag type is a critical element in enabling efficient writing via broadcasts to more than one tag at a time because it can assure that the data is going to be written to the correct location in memory.

Using the software tag type could require the storage and maintenance of a potentially huge number of lookup tables, one for each software tag type. If each type were to have a completely different mapping, there would be two major issues that would make cross-industry and cross-customer usage difficult. The first issue is a management problem—who will manage and control these tables? For cross-industry and cross-customer usage, not only the data fields need to be standardized, but these tables need to have standard meanings for a given software type. In addition, the large number of these tables presents a memory requirement and maintenance problem that may be excessive for a given application environment.

The second issue is a practical one relating to usage of the tag. It is quite likely that if a tag is to be used by many parties, there would be some data fields that would be common needs of them all, and some that would be distinctive. If each of the parties were to use their own software type, potentially a very mixed collection of software types could appear together at a later point in the processing chain. As an example, imagine a retailer who obtains products from many different manufacturers. If all of them used different software types, by the time items came to the checkout counter, you would be likely to have many more than one type present. This would imply that the usefulness of a write broadcasting capability is drastically reduced, since a given data field may be located in different memory locations in the tags of different software types. So, to continue the example, after paying, you could not effectively broadcast to the tags to 'turn off the alarm flag', because each software type potentially could have that field in a different memory location. You would have to individually group select on each tag type before the broadcast, and if there were many tag types, the usefulness of the broadcast is reduced.

Below is an example of a preferred embodiment of a method of using of 'software tag type' in a manner that will address these issues. The software tag type number is a series of bytes (in the case of the preferred embodiments 6 bytes), in which each successive byte represents a level in a hierarchy of classifications. Each level in the hierarchy defines a fixed memory location for data fields common to everything below in the hierarchy. So, in the example above, if everyone from manufacturing, through distribution, down to the retailer, needs to use the security field or alarm flag, this field mapping would be determined high in the hierarchy, at a node that would be represented by a byte in the software tag type. At the checkout application level, you could group select on the bytes representing the software type at the level where the security field is defined and be sure that no matter how different the tags below that point in the hierarchy were in memory mapping of other fields, the security field would be in the same location in all of them. The write broadcast to the security field could then proceed.

A second consequence of the hierarchical structure use of software tag type is that fewer lookup tables need be stored by any given customer. If software types were just random numbers specifying a mapping of the full memory of the tag, this would require a different table for each different mapping, in spite of the fact that there would be much overlap in data fields needed by many tag types. The hierarchy gives structure to the sets of tables, and only tables related to the relevant branch in the hierarchy need be stored and maintained. In addition, tables could be such that they only represent the data fields that are new additions for their node in the hierarchy. So, a table for manufacturing-distribution-retail may only contain entries for the memory locations of the data fields 'security' and 'UPC'. A base station that reads retail tags need only contain entries added on by being 'retail', such as 'price paid' (among others) for example. Hence the tables would be joined, to find the mappings relevant for any given node in the hierarchy, precluding the need for a larger set of tables mapping the whole memory. This approach also is more extensible, since as new fields are introduced, (perhaps as tag memory increases), a much smaller subset of tables needs to be updated or replaced than if each table mapped memory exhaustively.

Figures 7, 7B:
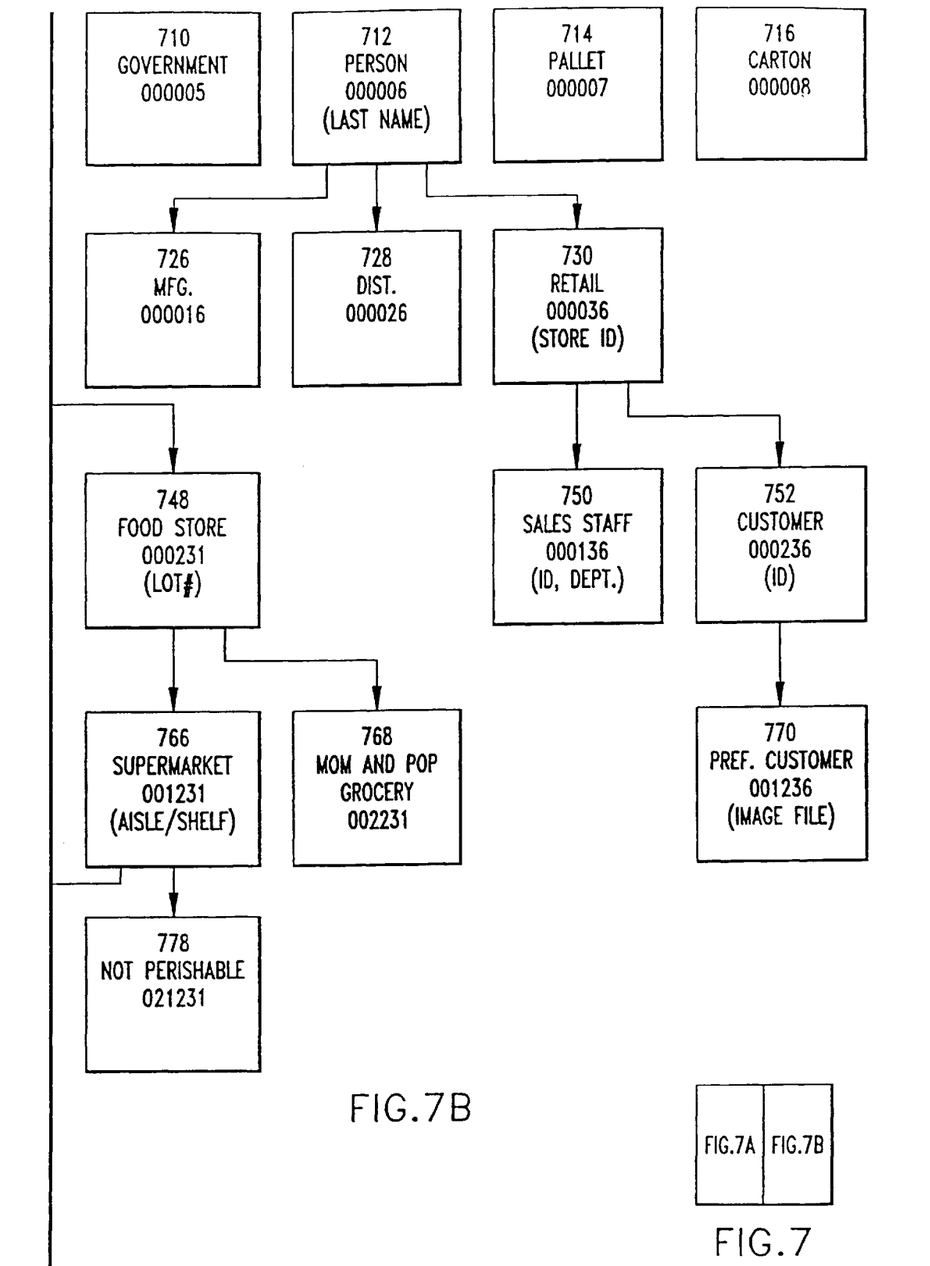
FIG. 7 A diagram of a hierarchical approach of software tag type memory mapping.
Figure 7A:
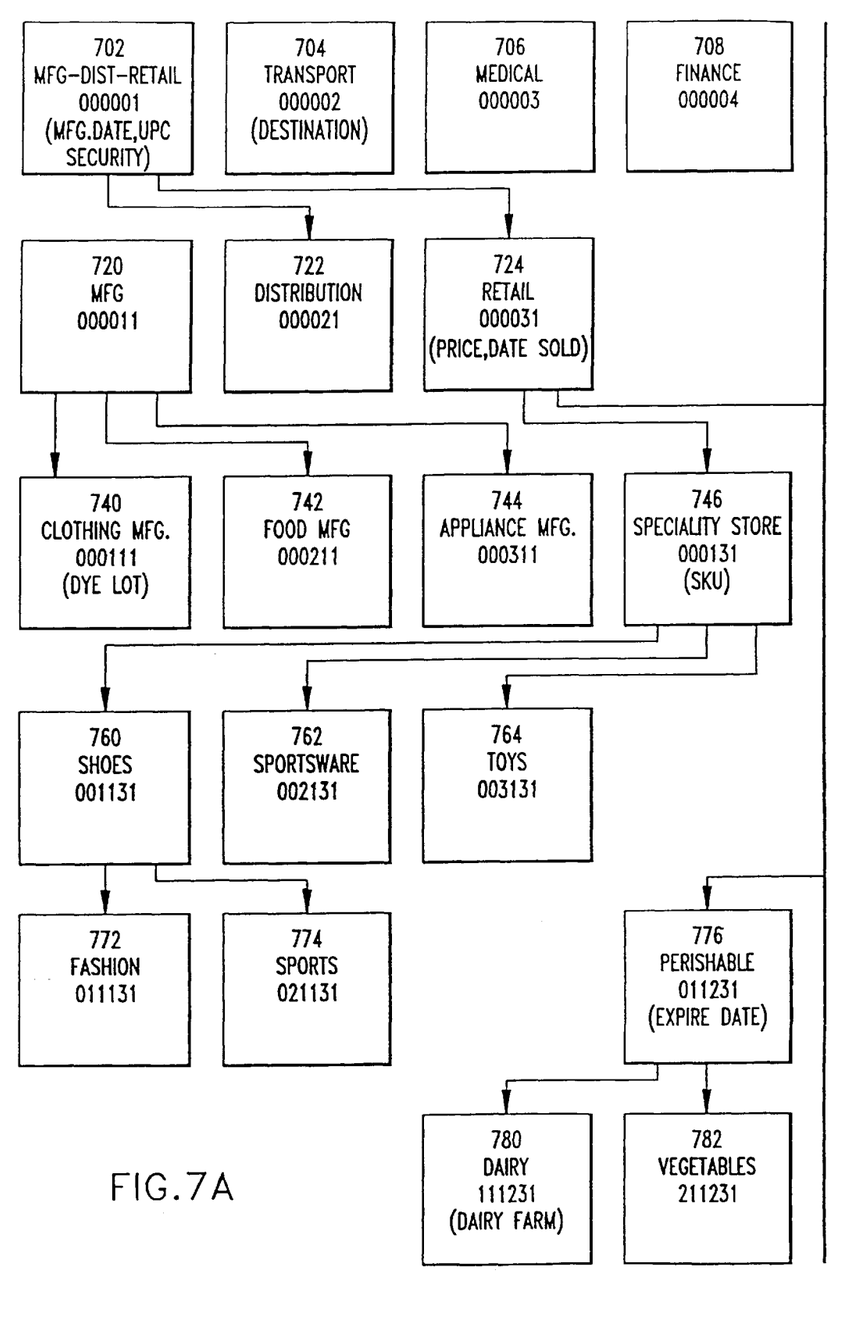

FIG. 7 gives an example 700 of the hierarchical approach to software type and memory mapping. As mentioned above, at each level in the hierarchy, there is a set of data fields that are common to that node and everything below that level on that branch of the hierarchy, and these would be put in fixed locations in the tag memory. The node in the hierarchy would be reflected as a value of a byte in the software tag type. As mentioned above, all manufacturing, distribution, and retail tags may require a UPC code. The memory location of the UPC would be the same across all tags used in that general industry. The fact that the tag is a manufacturing-distribution-retail tag' is encoded in the 1 st or 'lowest order' byte of the software type.

There are 256 possible choices of groupings like 'manufacturing-distribution-retail' which may be specified by the first byte of the 6 byte software tag number. In the example of FIG. 7, the number 1 has been assigned to the value of the first byte of the software type code for manufacturing-distribution-retail type tags 702. A general manufacturing-distribution-retail type tag would have a tag type number 000001. The common data across all tags of this software type are shown in the example as the manufacture date, the UPC number, and a security code. Other data which might be included might be the manufacturers identification code. In this case, all tags with a "1" in the first byte would have these data in the identical places in the tag memory subsection 230, and a base station reading the tag type code would know on the basis of the value of the first byte of the tag type code where to look in the tag memory to find the information required. The second byte in the example of FIG. 7 serves to break down the manufacturing 720, distribution 722, or retail 724, into the component parts by assigning the numbers 1, 2 and 3 respectively to the second byte of the software tag type number. The location of expiration date, however, is not guaranteed simply by knowing the tag is a manufacturing-distribution-retail tag on the basis of the first byte of the tag type code. However, by knowing it a "retail" 724 tag from the second byte, and 'food stores' 748, from the third byte, supermarket 766 from the fourth byte, and contains perishables 776, from the fifth byte, (a tag with the values 11231 in the lowest order bytes of the tag type number), guarantees a fixed location for expiration date since all such perishable food items are agreed to have an expiration date and the location in the tag memory is also agreed.

In the example chosen, a base station may order all tags with tag types having 11231 in the lowest order bytes of the tag type number to turn themselves on, and all others to remain silent. Then the base station may order the active tags to compare a number in a particular memory location (representing the expiration date) with a number sent by the base station (today's date), and to respond if the numbers match. If a tag responds, the object (for example a cut of meat in the meat cooler) which will go out of date today may be retrieved and marked down for quick sale.

It also may be the case that 'perishable' is a category that some sub-branch of the distribution industry may need to know about. In this case, the distribution industry would also agree on the location in tag memory of the expiration date, and presumably the expiration date would be in the same place in the tag memory for the all the distribution tag types, and the expiration date for the 'retail' tags might be in a different place in the tag memory than it is in the 'distribution' tags. The problem with any hierarchical approach is that there may be conflicts in classification. Some activities will fit into more than one category, or be some hybrid of several categories. The goal is to percolate upward data fields needed by everyone below that point in the hierarchy and try to reduce the duplication of fields in related branches of the hierarchy.

In FIG. 7, as you move from lower order bytes (for example) in the software type to higher order ones, you move from more general categories in the hierarchy to more specific ones. You may move from general industry requirements down to actual characteristics of the object or person being identified, and the data fields needed for its use in various applications within the industry. It may be necessary to repeat data fields in different industries, in different branches of the hierarchy, and potentially they may be stored in different memory locations. This means that to group select on anything near the bottom of the hierarchy you must also know (and include in the group select) the upper branches in the hierarchy, since the fields at this lower hierarchy level may be stored in different memory locations, depending on the hierarchy branch in which they reside.

As tags pass hands across industries, through the life cycle of the item, such as from manufacturing to distribution, the distributor may need to read the memory and reformat it to fit with the distribution structure, if it is different from the manufacturing structure. For example, at the point of manufacture of a shirt, the manufacturer will not be likely to know or care if this shirt is to be delivered to a specialty store or a department store, so ultimate store destination may not be a field used in the manufacturer's tag processing. The manufacturer may use the same memory elements that the distributor will later use for another purpose. As the tag is passed through to the distribution center, the tag may be updated as the destination is determined. This will probably mean reformatting the memory, but if the hierarchy was captured well, only the fields that correspond to those fields not shared by the two siblings in the hierarchy, i.e., not defined by their common parent, will have to be rewritten. Of course, as soon as the memory layout of the tag is changed, the tag software type will also change.

It is particularly critical that no data field be locked in a tag that is to be shared by siblings in the hierarchy unless the field in question is defined at the level of a common parent node. So, for example, if the manufacturer is to lock data—e.g., the UPC, and this tag is to be passed to the distributor, the UPC field should be defined at the level of the parent of the two of them. More generally, conventions of usage will have to be established so that any given handler of the tag would not lock in data fields specific to them, if the tag needed to be passed on to a sibling in the hierarchy level who might need to reuse that memory area for another field.

There are some tags that may be used specifically for a single, or small set of related applications. For example, tags 712 used for person tracking fit this description. These applications may be cross industry, and hence not fit very well within the hierarchical structure organized by industry. These types of applications, such as person tracking, are closely tied to the 'object', in this case, person. The same might be said for something like a 'pallet' 714, or 'carton' 716 tags. It is proposed that they be high level nodes—on a par with the top level industry breakdown—determined by the lowest order byte (for example) in the software tag type. Medical 706, finance 708, and government 710 are also shown at this level as examples. So of the 256 choices available under the first byte of the software type, a "person" tag 712 would be one choice equivalent to the manufacturing-distribution-retailing tags 702 as shown by FIG. 7. Under this broad category level, the industries may have their own particular needs. Pursuing the example of 'person tracking', at the 'person' level, you may have a need for name fields, that would be common across industries. However, the retail industry 730 may be a child of that person node, and it may need a 'store ID'. Lower levels in the hierarchy such as "customer" 752, and "preferred customer" 770 are also shown on FIG. 7. Other levels in the hierarchy shown by FIG. 7 are the second level manufacture tags 726 and distribution tags 728 equivalent to the retail tag 730 of the person 712 mode. Possible examples of classifications relating to the tag types having a 1 in the lowest order byte are also shown on FIG. 7 to show other examples of the hierarchical structure.

The invention is not limited to the above examples. The inventors anticipate many equivalent ways to accomplish the hierarchical approach to ordering the software tag types. In particular, which particular byte of the tag type code is higher in the hierarchy is not important, as long as the order of the hierarchy is accepted by the participants.

We claim:

1. An RF tag for communicating with a base station, comprising:
    a predefined hardware configuration;
    a tag antenna for receiving and sending RF information from and to the base station;
    a tag receiver/transmitter for receiving and sending information from and to the tag antenna;
    a logic section for receiving and sending information from and to the tag receiver/transmitter;
    a first tag memory having data, the data having a layout of information; and
    a second tag memory comprising a directory, the directory containing information about the layout of information in the first tag memory including the predefined hardware configuration of the RF tag, where the logic section uses the directory to retrieve the data.

2. An RF tag for communicating with a base station, comprising:
    a predefined hardware configuration;
    a tag antenna for receiving and sending RF information from and to the base station;
    a tag receiver/transmitter for receiving and sending information from and to the tag antenna;
    a logic section for receiving and sending information from and to the tag receiver/transmitter;
    a first tag memory having data, the data having a layout of information, wherein the logic section retrieves the data; and
    a second tag memory consisting of a tag type identifying code, wherein the logic section retrieves the tag type identifying code, the tag type identifying code determining the layout of the information in the data of first tag memory including the predefined hardware configuration of the RF tag.

3. The RF tag of claim 2, wherein the second tag memory is recoded by signals from the base station.

4. The RF tag of claim 2, wherein the second tag memory comprises a first part and a second part, and wherein the first part—is unrecodable—by signals from a base station.

5. The RF tag of claim 2, wherein the tag type identifying code is arranged in a hierarchical order.

6. The RF tag of claim 2, wherein the tag type identifying code is a series of bytes in which each successive byte represents a level in a hierarchy of classifications.

7. The RF tag of claim 6, wherein a value of a byte in a first level in the hierarchy defines a fixed memory location in the first tag memory for information fields common to each level below the first level in the hierarchy.

8. A system for communicating information, comprising:
    a plurality of Radio Frequency (RF) tags, the plurality of RF tags comprising a plurality of types of tag (tag types), each tag type having a tag type identifying code and a predefined hardware configuration, each tag comprising a tag antenna for sending and receiving RF information to and from a base station, a tag receiver/transmitter for receiving and sending information from and to the tag antenna, a logic section for receiving and sending information from and to the tag receiver/transmitter, a first tag memory having data with a layout of information, the logic section able to retrieve the data, a second tag memory comprising the tag type identifying code, wherein the logic section retrieves the tag type identifying code, the tag type identifying code determining the layout of the information in the first tag memory including the predefined hardware configuration of the RF tag, and;
    a base station, the base station comprising a base station receiver/transmitter for sending and receiving RF information to and from a base station antenna, the base station antenna for sending and receiving information to and from an RF tag, a base station computer controlling the base station receiver/transmitter, a base station memory, the base station memory containing the tag type identifying code and the layout of information in the data of the first memory including the predefined hardware configuration of at least one tag type, whereby the base station computer uses the base station memory to determine the layout of information in the data of the first memory including the predefined hardware configuration of at least one of the plurality of RF tags.

9. The system of claim 8, wherein the second tag memory is coded and recoded by signals from the base station.

10. The system of claim 8, wherein the second tag memory comprises a first part and a second part, and wherein the first part—not recodable—by RF signals from the base station.

11. The system of claim 8, wherein the base station computer uses a "look-up table" to retrieve the location of information contained in the data of the first tag memory of at least one of the plurality of tags, the information retrieved on the basis of the tag type identification code.

12. The system of claim 8, wherein the base station computer identifies a location of information stored in the data of the first tag memory of at least one of the plurality of tags, the location identified on the basis of the tag type identification code.

13. The system of claim 12, wherein the location of information is the location of a Universal Product Code (UPC) stored in the first tag memory.

14. The system of claim 12, wherein the location of information is the location of a security code stored in the first tag memory.

15. The system of claim 12, wherein the location of information is the location of a product manufacture date code stored in the first tag memory.

16. The system of claim 12, wherein the location of information is the location of a personal identification code stored in the first tag memory.

17. The system of claim 8, wherein the first tag memory has a defined capacity, and wherein the base station computer identifies the defined capacity of memory contained in the first tag memory of at least one of the plurality of tags on the basis of the tag type identification code.

18. The system of claim 8, wherein the base station computer identifies commands recognized by at least one of the plurality of tags on the basis of the tag type identification code.

19. The system of claim 8, wherein the base station computer identifies measurement capabilities of at least one of the plurality of tags on the basis of the tag type identification code.

20. The system of claim 8, wherein the tag type identifying code is arranged in a hierarchical order.

21. The system of claim 8, wherein the tag type identifying code is a series of bytes in which each successive byte represents a level in a hierarchy of classifications.

22. The system of claim 21, wherein a first level in the hierarchy defines a fixed memory location in the first tag memory for information fields common to each level below the first level in the hierarchy.

23. A base station for communicating with a plurality of Radio Frequency (RF) tags, the plurality of tags comprising a plurality of types of tags (tag types), each tag type having a predefined hardware configuration, each tag of each tag type having a first tag memory, the first tag memory having a layout of information, each tag of each tag type having a second tag memory, the second tag memory consisting of a tag type identifying code, the tag type identifying code determining the layout of information in the first tag memory including the predefined hardware configuration of the RF tag, comprising:
  a base station antenna for send and receiving information to and from an RF tag;
  a base station receiver/transmitter for sending and receiving RF information to and from the base station antenna;
  a base station computer controlling the base station receiver/transmitter;
  a base station memory, the base station memory containing the tag type identifying code and the layout of information in the data of the first memory and the predefined hardware configuration of at least one tag type, whereby the base station computer uses the base station memory to determine the layout of information in the data of the first memory including the predefined hardware configuration of at least one of the plurality of RF tags.

24. The base station of claim 23, wherein the base station computer uses a "look-up table" to retrieve the location of the information contained in the data of the first tag memory of at least one of the plurality of tags on the basis of the tag type identification code.

25. The base station of claim 23, wherein the base station computer identifies a location of information stored in the first tag memory of the at least one of the plurality of tags on the basis of the tag type identification code.

26. The base station of claim 25, wherein the location of information is the location of a Universal Product Code (UPC) stored in the first tag memory.

27. The base station of claim 25, wherein the location of information is the location of a security code stored in the first tag memory.

28. The base station of claim 25, wherein the location of information is the location of a product manufacture date code stored in the first tag memory.

29. The base station of claim 25, wherein the location of information is the location of a personal identification code stored in the first tag memory.

30. The base station of claim 23, wherein the base station computer identifies the amount of memory contained in the first tag memory of at least one of the plurality of tags on the basis of the tag type identification code.

31. The base station of claim 23, wherein the base station computer identifies commands recognized by at least one of the plurality of tags on the basis of the tag type identification code.

32. The base station of claim 23, wherein the base station identifies measurement capabilities of at least one of the plurality of tags on the basis of the tag type identification code.

33. A method of storing and communicating information, comprising:
  communicating a tag type identifying code between an RF tag and a base station, the tag type identifying code determining a layout of information contained in a first memory including a predefined hardware configuration of each tag of a type of RF tags, the tag type identifying code stored in a second memory of each tag of each type of RF tags.

34. The method of claim 33, wherein the tag type identifying code is arranged in a hierarchical order.

35. The method of claim 33, wherein the tag type identifying code is a series of bytes in which each successive byte represents a level in a hierarchy of classifications.

36. The method of claim 35, wherein a first level in the hierarchy defines a fixed memory location in the first tag memory for information fields common to each level below the first level in the hierarchy.

37. The method of claim 33, wherein the tag type identifying code of the tag is transmitted from the tag to the base station, further comprising;
  transmitting data contained in the first memory of the RF tag to the base station; and
  retrieving information from the data using the layout of information determined by the tag type identifying code.

38. The method of claim 37, wherein the information retrieved is a universal product code (UPC) number.

39. The method of claim 38, wherein the UPC code is retrieved on the basis of one byte of the tag type identifying code.

40. The method of claim 37, wherein the information retrieved is a security code.

41. The method of claim 40, wherein the security code is retrieved on the basis of one byte of the tag type identifying code.

42. The method of claim 33, further comprising;
  comparing a first tag type identifying code transmitted from the base station to the tag with a second tag type identifying code stored in the second memory of the RF tag.

43. The method of claim 42, further comprising;

transmitting data contained in the first memory of the RF tag to the base station if the first and second tag type identifying codes are identical; and retrieving information from the data using the layout of information determined by the tag type identifying code.

44. The method of claim 42, further comprising;

transmitting data and a data address from the base station to the tag;

writing the data to the data address in the first memory of the RF tag if the first and the second tag type identifying codes are identical.

45. The method of claim 42, further comprising;

transmitting data from the tag to the base station if the first and second tag type identifying codes are identical and if a security code in the tag memory is set.

46. The method of claim 33, wherein a tag type code is transmitted from the base station to the tag, further comprising;

writing the tag type identifying code to the second memory of the RF tag.

47. The method of claim 46, further comprising;

transmitting data and a data address from the base station to an RF tag; and writing the data to the data address in the first memory of the RF tag.

48. A method of storing and communicating information, comprising:

communicating a tag type identifying code between a base station and an RF tag, the tag type identifying code determining a command set recognized by the RF tag including a predefined hardware configuration of the RF tag, the tag type identifying code stored in a memory of the RF tag.

49. The method of claim 48, further comprising;

transmitting a command from the base station to the RF tag; and executing the command if the tag type identifying code determines that a command is recognized by the RF tag.

50. A method of storing and communicating information comprising:

communicating a tag type identifying code between a base station and an RF tag, the tag type identifying code determining a measurement capability of the RF tag including a predefined hardware configuration of the RF tag, the tag type identifying code stored in a memory of the RF tag.

* * * * *